Sept. 6, 1938.  E. WESNIGK  2,129,187
AUTOMOBILE
Filed Oct. 22, 1935
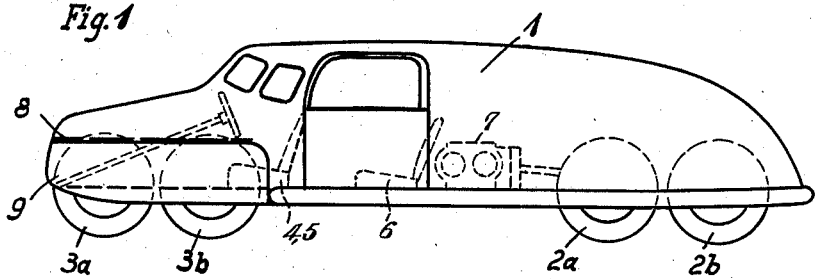
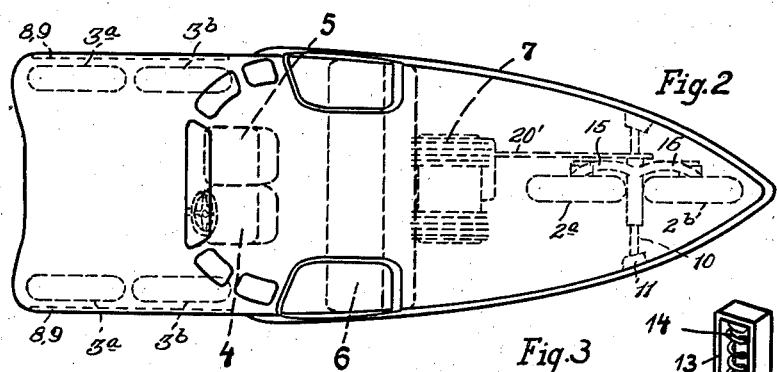
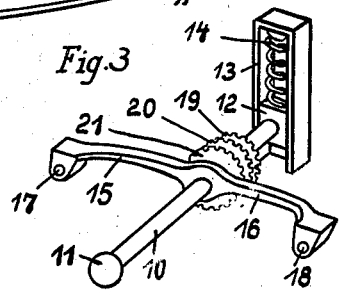
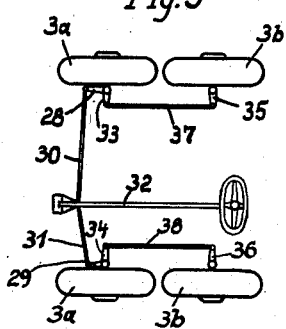
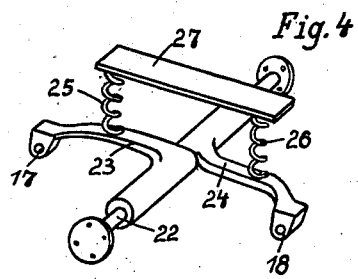
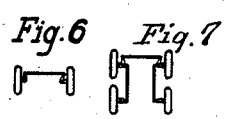
Inventor:
Erwin Wesnigk.

Patented Sept. 6, 1938

2,129,187

UNITED STATES PATENT OFFICE 2,129,187

AUTOMOBILE

Erwin Wesnigk, Berlin, Germany

Application October 22, 1935, Serial No. 46,170
In Germany October 26, 1934

3 Claims. (Cl. 180—21)

My invention relates to automobiles and in particular to automobiles having a triangle like basis.

In automobiles having a triangle like basis and more particularly in the usual three wheeled cars driven along their middle plane, all wheels have substantially equal significance and none of the three wheels can be completely unloaded so as to rise from the track. If, however, the single driven wheel disposed in the middle plane of the car strikes an oblique obstruction, it is caused to slide sidewardly because no force exists which holds the single wheel against sideward movement.

One object of my invention is to construct an automobile having a triangle like basis in which the sideward sliding of the single wheel in the middle plane of the automobile is prevented.

I obtain this object by arranging two front wheels on opposite sides of the car and instead of the single rear wheel, two rear wheels disposed in a tandem arrangement in the middle plane of the car and running separately on the road, each of said rear wheels being carried on the body of the car vertically movable relative to the latter and the other rear wheel and being pressed resiliently against the road independently of the other rear wheel.

In a preferred embodiment of my invention, I increase the resistance of the automobile against sideward sliding by providing instead of single front wheels, two front wheels on either side of the car in tandem arrangement similar to that of the rear tandem wheels.

Figures 1 and 2 are a lateral and a top view of a car having three wheel tandems.

Figure 3 is a perspective view of the rear wheel suspension shown in Figure 2.

Figure 4 is a simplified perspective view of another embodiment of a rear wheel suspension.

Figure 5 is a top view of a pair of front wheel tandems with steering device.

Figures 6 and 7 are top views of different car basis diagrams according to the present invention.

According to Figs. 1 and 2, a streamlined car body 1 is supported on two rear wheels 2a, 2b and two pairs of front wheels 3a, 3b. It contains a far advanced driver's seat 4 and in the shown example a juxtaposed further seat 5, and further back a three seat bench 6. Between these and the rear wheels 2a, 2b, there is disposed a driving motor 7 with gearing, tank and other accessories.

All wheels are completely enclosed in the streamlined body. For the purpose of avoiding an excessive breadth of the streamlined body as would be necessary for rigidly enclosing the steered front wheels, the body portions aside of the front wheels consist of flaps 9 adapted to swing out about hinges 8 so as to follow the steering movements. As short curves necessitating large steering movements can only be run with reduced speed, the deformation of the streamline shape, caused by outwardly swung flaps 9, remain innoxious.

According to Fig. 3 the rear wheels, 2a and 2b are suspended on a cross supporting tube 10 which on the wall of the car is rotatably and swingably held by an articulating ball 11, on its other end extends with a pin into a sliding piece 12, held in a guide 13, arranged on the other car wall. A pressure spring 14 is provided on top of the sliding piece 12, whereby the latter is capable of yielding in essentially vertical direction. The cross tube 10 supports two swingable arms, 15, 16, provided with bearings 17, 18, for the wheels 2a, 2b.

Concentrically to the cross tube 10, three chain wheels, 19, 20 and 21, connected to one another, are rotatably disposed, one of which is driven from the motor by means of a chain drive 20', shown in dotted lines in Fig. 2, while the other wheels are coupled by means of chains to chain wheels secured to the rear wheel shafts.

According to Fig. 4, the rear wheels 2a, 2b are held on a cross beam 22 by two swinging levers 23, 24 holding the wheel bearings 17, 18. The said swinging levers are singly loaded over pressure springs 25, 26 by a supporting member 27 arranged on the underframe or body of the car.

According to Fig. 5, the front wheel tandems 3a, 3b have singly elastically loaded axle studs, held on the car frame or body for example in essentially vertical slide guides or on swinging levers with the aid of springs. Steering levers 28, 29 of the foremost wheels 3a are connected by steering links 30, 31 to the steering lever of a usual steering post 32. Further levers 33, 34 of the foremost wheels 3a and corresponding levers 35, 36 of the other fore wheels 3b are interconnected by push rods 37, 38 with such longitudinal dimensions and angular dispositions of the levers 33, 34, 35, 36, that correct steering is attained. This means that the wheels 3b are turned at an angle which is so much smaller than that of the wheels 3a, that in running a curve the axes of all front wheels cross each other as nearly as possible in a common point on the middle axis 10 or 22 of the rear wheels.

According to Figs. 6 and 7, the possibilities given by the invention include two main types of vehicles: A four wheeled car and a six wheeled car having triangle like basis, said basis being formed in Figure 6, by a rear wheel tandem and single front wheels, and in Figure 7 by three tandems.

I claim:

1. An automobile comprising a body, two front wheels one on each of the opposite sides of the body respectively, two rear wheels disposed in a tandem arrangement in the middle plane of said body and running separately on the road, each of said rear wheels being carried on said body vertically movable relative to the latter and to the other rear wheel, and means on each of said rear wheels to press the same resiliently against the road independently of the other rear wheel.

2. An automobile comprising a body, a front wheel tandem on either side of said body, two rear wheels disposed in a tandem arrangement in the middle plane of said body and running separately on the road, each of said rear wheels being carried on said body vertically movable relative to the latter and to the other rear wheel and means on each of said rear wheels to press the same resiliently against the road independently of the other rear wheel.

3. An automobile comprising a body, two front wheels on opposite sides of the body respectively, two rear wheels disposed in a tandem arrangement in the middle plane of said body and running separately on the road, a cross beam carried on said body between said tandem wheels, two swing levers on said cross beam, said swing levers projecting in opposite longitudinal directions respectively, and having their free ends substantially adjacent the middle plane of said body, said rear wheels being carried on the free ends of said levers respectively, and a pressure spring between each of said levers and said body to press each of said rear wheels resiliently against the road independently of the other rear wheel.

ERWIN WESNIGK.